United States Patent
Kim (10) Patent No.: US 9,028,999 B2
(45) Date of Patent: May 12, 2015

(54) SECONDARY BATTERY

(75) Inventor: Dukjung Kim, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 793 days.

(21) Appl. No.: 13/276,722

(22) Filed: Oct. 19, 2011

(65) Prior Publication Data

US 2012/0214031 A1   Aug. 23, 2012

(30) Foreign Application Priority Data

Feb. 18, 2011 (KR) .................. 10-2011-0014350

(51) Int. Cl.
*H01M 2/26* (2006.01)
*H01M 2/02* (2006.01)
*H01M 2/30* (2006.01)
*H01M 2/22* (2006.01)

(52) U.S. Cl.
CPC ........... *H01M 2/30* (2013.01); *H01M 2/22* (2013.01); *H01M 2200/00* (2013.01)

(58) Field of Classification Search
CPC .................................. H01M 2/22; H01M 2/30
USPC ............................................. 429/121, 178, 7
See application file for complete search history.

(56) References Cited

U.S. PATENT DOCUMENTS

2008/0038628 A1   2/2008  Yamauchi et al.

FOREIGN PATENT DOCUMENTS

| JP | 2002-124236 A | 4/2002 |
| JP | 2003-223886 A | 8/2003 |
| JP | 2008-066255 A | 3/2008 |
| KR | 10-2001-0011900 A | 2/2001 |
| KR | 10 2006-0060463 A | 6/2006 |
| KR | 10 2007-0041122 A | 4/2007 |

OTHER PUBLICATIONS

Korean Office Action dated Jul. 18, 2012.
Korean Notice of Allowance in KR 10-2011-0014350, dated Jan. 14, 2013 (Kim).

*Primary Examiner* — Helen O Conley
(74) *Attorney, Agent, or Firm* — Lee & Morse, P.C.

(57) ABSTRACT

Provided is a secondary battery including a case having an opening and an internal cavity, an electrode assembly disposed in the internal cavity, a collector plate electrically connected to the electrode assembly and disposed in the internal cavity, an electrode terminal electrically connected to the electrode assembly, a cap plate sealing the opening of the case, and a safety device between the collector plate and the electrode terminal. A portion of the electrode terminal extends beyond the cap plate such that the electrode terminal is exposed.

13 Claims, 6 Drawing Sheets

SECONDARY BATTERY

BACKGROUND

1. Field

Embodiments of the present invention relate to a secondary battery.

2. Description of the Related Art

A rechargeable, secondary battery may be charged and discharged unlike a primary battery that may not be recharged. A low capacity secondary battery that comprises a pack shaped battery cell may be used as a power source for various small portable electronic devices such as cellular phones or camcorders. A high capacity secondary battery that has several tens of the battery cells that are connected may be used as power sources for driving motors such as an electric scooter, a hybrid automobile or an electric automobile.

The secondary battery may be fabricated into various shapes including a cylindrical and a prismatic shape and may include an electrode assembly including a positive electrode and a negative electrode and an insulating separator that is interposed in between the electrodes and is inserted into a case. The case is mounted with a cap assembly. In the secondary battery, when the internal pressure of the batteries rises above a predetermined level due to excessive pressure generated by overcharge or an electrolyte is decomposed, a danger of fire or explosion results.

Accordingly, there is a need for a secondary battery having improved safety.

SUMMARY

Embodiments are therefore directed to a secondary battery, which substantially overcome one or more of the problems due to the limitations and disadvantages of the related art.

One or more embodiments may provide a secondary battery including a case including an opening and an internal cavity, an electrode assembly disposed in the internal cavity, a collector plate electrically connected to the electrode assembly and disposed in the internal cavity, an electrode terminal electrically connected to the electrode assembly, a cap plate sealing the opening of the case, and a safety device between the collector plate and the electrode terminal, wherein a portion of the electrode terminal extends beyond the cap plate such that the electrode terminal is exposed.

The safety device may include a piezoelectric element coupled to the collector plate, a conductor on the piezoelectric element, an insulator on the conductor, and a conductive elastic member on the insulator and connecting the electrode terminal and the collector plate.

The secondary battery may further include a second collector plate connected to the electrode assembly, the second collector plate may have a different polarity from a polarity of the collector plate, and wire connecting the second collector plate and the conductor. At least an end portion of the collector plate may be retained within the piezoelectric element. The piezoelectric element may be retained within the conductor. The conductor may be retained within the insulator.

The conductive elastic member may include a first connecting section contacting the collector plate, a second connecting section extending from the first connecting section and contacting the insulator, and a third connecting section extending from the second connecting section and contacting the electrode terminal. The third connecting section may include a plurality of projections. The conductive elastic member may be substantially U-shaped and may include three sidewalls and a central opening extending therethrough.

The conductive elastic member may be configured to retain the piezoelectric element, the conductor, and the insulator therein.

A lower insulation member may be disposed between the collector plate and the cap plate, a fixing member may be coupled to a bottom portion of the lower insulation member, and the fixing member may include a planar portion contacting the lower insulation member, a curved portion contacting the collector plate, and a coupling portion protruding from the curved portion and contacting opposing edges of the collector plate.

The collector plate may have an insertion groove formed therein, and the coupling portion may be disposed in the insertion groove. The insertion groove may include two insertion grooves defined in opposing side edges of the collector plate. The fixing member may be slidably coupled to the lower insulation member.

Additional aspects and/or advantages of the embodiments will be set forth in part in the description which follows and, in part, will be obvious from the description, or may be learned by practice of the embodiments.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2011-0014350, filed on Feb. 18, 2011, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, embodiments of the present invention will be described in detail with reference to the accompanying drawings.

First, a secondary battery according to an embodiment of the present invention will be described with reference to FIG. 1.

Figure 1:
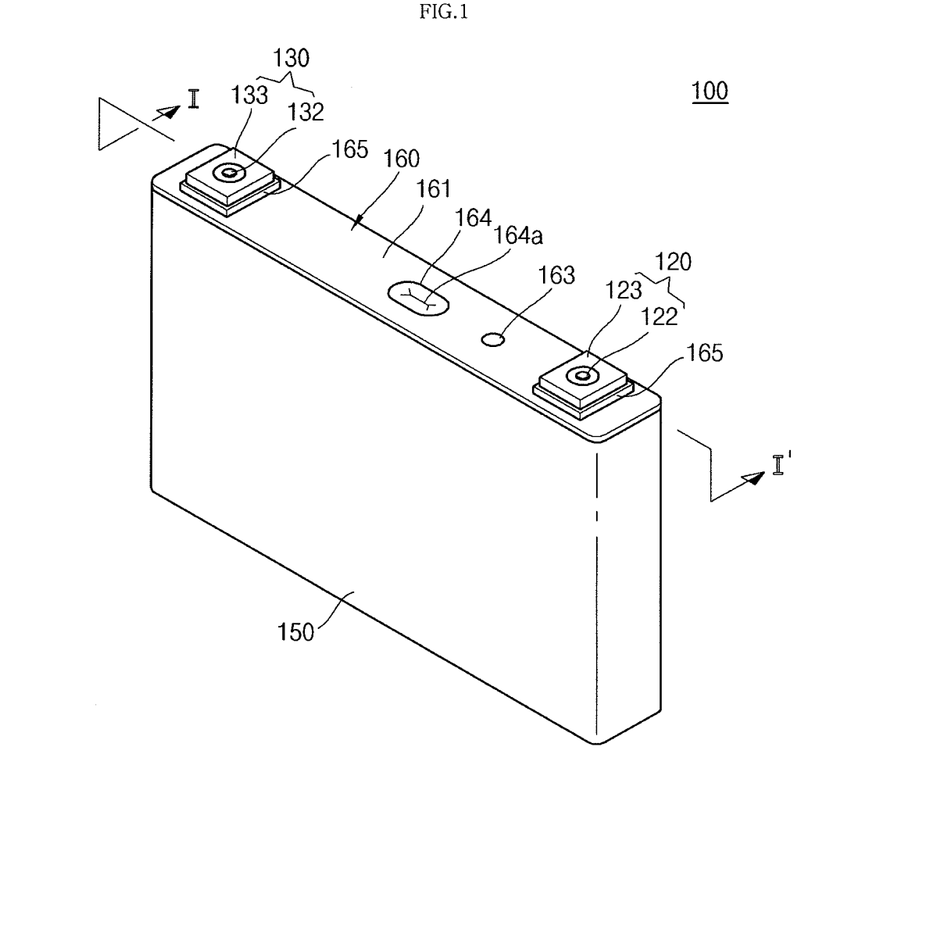
FIG. 1 illustrates a perspective view of a secondary battery according to an embodiment of the present invention.
Figure 2:
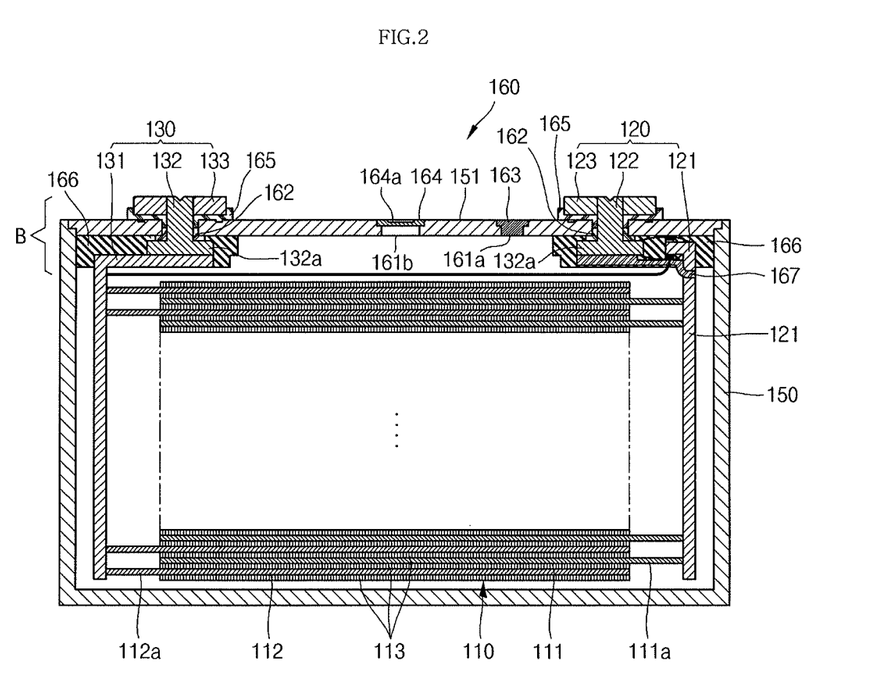
FIG. 2 illustrates a cross-sectional view of the secondary battery, taken along the line I-I' of FIG. 1.
Figure 3A:
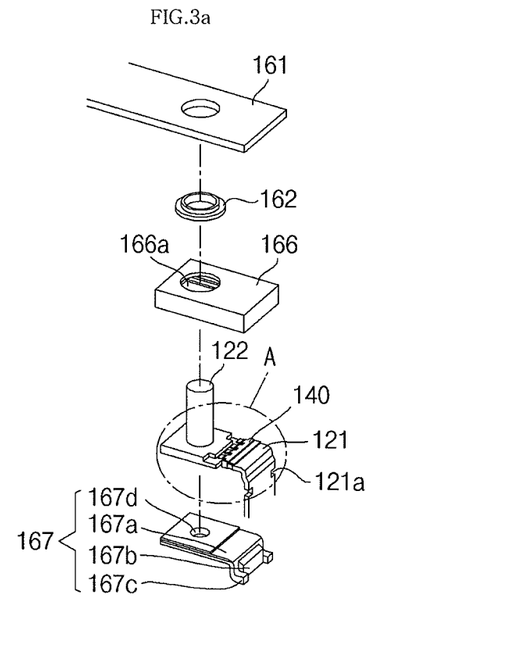
FIG. 3A illustrates an exploded perspective view of a portion of the secondary battery shown in FIG. 1.
Figure 3B:
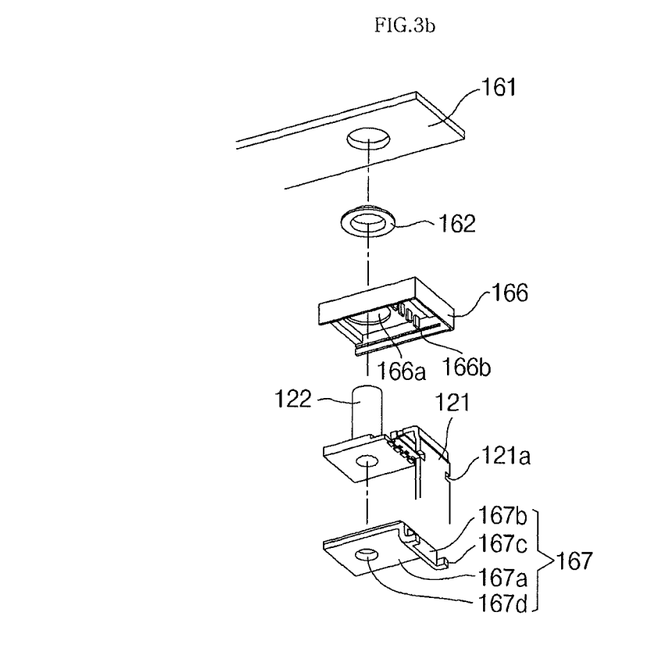
FIG. 3B illustrates an exploded perspective view of a portion of the secondary battery shown in FIG. 1.

FIG. 1 is a perspective view of a secondary battery according to an embodiment of the present invention. FIG. 2 is a cross-sectional view of the secondary battery, taken along the line I-I' of FIG. 1. FIGS. 3A and 3B are exploded perspective views illustrating a coupling method of a safety device and a fixing member in the secondary battery shown in FIG. 1.

Referring to FIGS. 1 to 3B, the illustrated rechargeable battery 100 includes an electrode assembly 110, a first electrode terminal 120, a second electrode terminal 130, a case 150, and a cap assembly 160.

The cap assembly 160 may be formed by winding together or stacking together a stack of a first electrode plate 111, a separator 113 and a second electrode plate 112. The first electrode plate 111, the separator 113, and the second electrode plate 112, may each be formed of a thin plate or layer. The stack of a first electrode plate 111 may include two or more first electrode plates 111. The stack of a separator 113 may include two or more separators 113. The stack of a second electrode plate 112 may include two or more second electrode plates 112. According to an embodiment, the cap assembly 160 may be formed by winding together or stacking together a first electrode plate 111, a separator 113, and a second electrode plate 112. Here, the first electrode plate 111 may operate as a positive electrode and the second electrode plate 112 may operate as a negative electrode, or vice versa.

The first electrode plate 111 may be formed by coating a first electrode active material, such as a transition metal oxide, on a first electrode collector. The first electrode collector may be formed of a metal foil made of, for example, aluminum.

The first electrode collector may include a first electrode uncoated region 111a that is a region not coated with a first electrode active material. The first electrode uncoated region 111a may become a path of flow of current between the first electrode plate 111 and the outside thereof, for example, between the first electrode plate 111 and other components of the battery 100.

The second electrode plate 112 may be formed by coating or disposing a second electrode active material, such as graphite or carbon, on a second electrode collector. The second electrode collector may be formed of a metal foil made of, for example, copper or nickel.

The second electrode collector may include a second electrode uncoated region 112a that is a region not coated with a second electrode active material. The second electrode uncoated region 112a may become a path of flow of current between the second electrode plate 112 and the outside thereof, for example, between the second electrode plate 112 and other components of the secondary battery 100.

The first electrode plate 111 and the second electrode plate 112 may have different polarities.

The separator 113 may be interposed between the first electrode plate 111 and the second electrode plate 112 for preventing a short-circuit therebetween and for allowing movement of lithium ions. In addition, the separator 113 may be formed of polyethylene (PE), polypropylene (PP), or a composite film of PE and PP. However, embodiments are not limited to the materials specifically described herein.

A first electrode terminal 120 and a second electrode terminal 130 may be electrically connected to the first electrode plate 111 and the second electrode plate 112, respectively, at opposing ends of the electrode assembly 110.

The electrode assembly 110 may be accommodated or retained in the case 150 with an electrolyte. The electrolyte may include an organic solvent such as ethylene carbonate (EC), propylene carbonate (PC), diethyl carbonate (DEC), ethyl methyl carbonate (EMC) or dimethyl carbonate (DMC), and a lithium salt such as $LiPF_6$ or $LiBF_4$. In addition, the electrolyte may be a liquid, solid, and/or gel electrolyte.

The first electrode terminal 120 may be made of a metal or equivalents thereof, and may be electrically connected to the first electrode plate 111. The first electrode terminal 120 may include a first collector plate 121, a first terminal pillar 122, and a first terminal plate 123.

The first collector plate 121 may contact the first electrode uncoated portion 111a, that protrudes from one end of the electrode assembly 110. In practice, the first collector plate 121 may be welded or otherwise attached to the first electrode uncoated portion 111a. The first collector plate 121 may be formed in a substantially inverted 'L' shape. As shown more clearly in FIG. 3A, the first collector plate 121 may have a substantially 'U' shaped insertion groove 121a formed at a right angle with respect to the cap plate 161. The first collector plate 121 may, according to an embodiment, include two insertion grooves 121a in outer edge portions of the first collector plate 121.

A coupling portion 167c of a fixing member 167, which will later be described, may be inserted into the insertion groove 121a. The first collector plate 121 may be made of, for example, copper or a copper alloy. However, the material that may be used to form the first collector plate 121 is not limited to the materials specifically described herein.

The first terminal pillar 122 may penetrate a cap plate 161, or extend through a through-hole formed in the cap plate 161, which will later be described. The first terminal pillar 122 may protrude and extend upwardly from, i.e., above a top surface of the cap plate 161 by a predetermined length. In other words, a portion of the first terminal pillar 122 is exposed. In addition, the first terminal pillar 122 may be electrically connected to the first collector plate 121 under the cap plate 161. The first terminal pillar 122 may have a flange 122a under the cap plate 161 to prevent the first terminal pillar 122 from being dislodged from the cap plate 161. In the first terminal pillar 122, a region or a ledge positioned under the flange 122a may contact the first collector plate 121. Here, the first terminal pillar 122 may be electrically insulated from the cap plate 161. The first terminal pillar 122 may be made of, for example, copper or a copper alloy.

The first terminal plate 123 may be formed in a hexahedral shape and may have a hole formed in its center. In addition, the first terminal plate 123 may be coupled to the first terminal pillar 122. That is to say, the first terminal pillar 122 may be coupled to or extend through the hole of the first terminal plate 123. Further, after the first terminal plate 123 is coupled to the first terminal pillar 122, a top portion of the first terminal pillar 122 may be riveted. Therefore, the first terminal plate 123 may be fixed to the first terminal pillar 122. In other words, riveting the first terminal pillar 122 may further secure the first terminal plate 123 to the first terminal pillar 122. The first terminal plate 123 may be made of, for example, copper or a copper alloy. In addition, the first terminal plate 123 may be insulated from the cap plate 161.

The second electrode terminal 130 may be made of, for example, copper or a copper alloy, and may be electrically connected to the second electrode plate 112. The second electrode terminal 130 may include a second collector plate 131, a second terminal pillar 132, and a second terminal plate 133.

The second collector plate 131 may contact a second electrode uncoated portion 112a protruding at one end of the electrode assembly 110. In practice, the second collector plate 131 may be welded or otherwise attached to the second electrode uncoated portion 112a.

The second collector plate 131 may be formed in a substantially inverted 'L' shape. The second collector plate 131 may be made of, for example, copper or a copper alloy.

The second terminal pillar 132 may penetrate the cap plate 161 or extend through a through-hole of the cap plate 161, which will later be described. The second terminal pillar 132 may protrude and extend upwardly from, i.e., extend above a top surface of the cap plate 161 by a predetermined length. In other words, a portion of the second terminal pillar 132 is exposed. In addition, the second terminal pillar 132 may be electrically connected to the first collector plate 121 under the cap plate 161. The second terminal pillar 132 may have a flange 132a under the cap plate 161 to prevent the second terminal pillar 132 from being dislodged from the cap plate 161. In the second terminal pillar 132, a region or ledge positioned under the flange 122a may contact the first collector plate 121. Here, the second terminal pillar 132 may be electrically insulated from the cap plate 161. The second terminal pillar 132 may be made of, for example, copper or a copper alloy.

The second terminal plate 133 may have a hole formed in its center. In addition, the second terminal plate 133 may be coupled to the second terminal pillar 132. That is to say, the second terminal pillar 132 may be coupled to or extend through the hole of the second terminal plate 133. Further, after the second terminal plate 133 is coupled to the second terminal pillar 132, a top portion of the second terminal pillar 132 may be riveted. Therefore, the second terminal plate 133 may be fixed to the second terminal pillar 132. In other words, riveting the second terminal pillar 132, as described, may further secure the second terminal plate 133 to the second terminal pillar 132. The second terminal plate 133 may be made of, for example, copper or a copper alloy. In addition, the second terminal plate 133 may be electrically connected to the cap plate 161. Accordingly, the case 150 and the cap plate 161, which will later be described, may have the same polarity (e.g., positive polarity) as the second electrode terminal 130.

Figure 4:
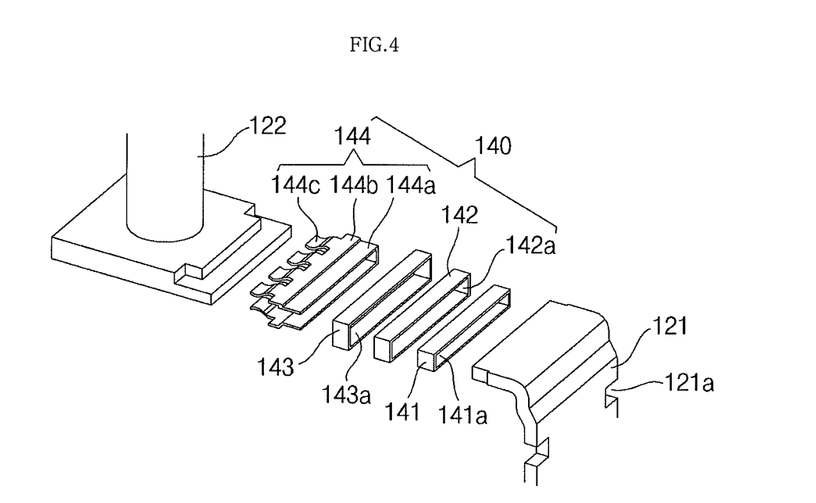
FIG. 4 illustrates an enlarged perspective view of a portion 'A' shown in FIG. 3A.
Figure 5:
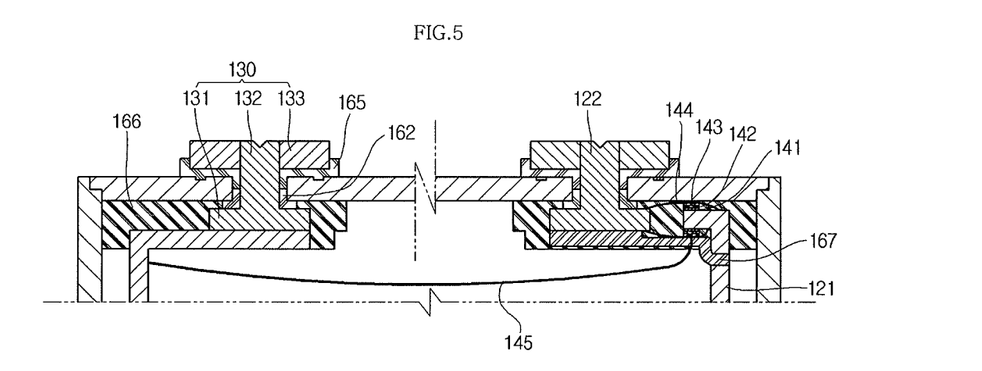
FIG. 5 illustrates an enlarged view of a portion 'B' shown in FIG. 2.

FIG. 4 is an enlarged perspective view of a portion 'A' shown in FIG. 3A. FIG. 5 is an enlarged broken view of a portion 'B' shown in FIG. 2.

As shown in FIGS. 4 and 5, a safety device 140 may be formed between the first collection plate 121 and the first terminal pillar 122. The safety device 140 may be shorted when the internal pressure of the secondary battery 100 exceeds a predetermined pressure due to overcharge. The safety device 140 may be electrically connected to the second collector plate 131. Thus, the first electrode terminal 122 and the second electrode terminal 132 may be electrically shorted, thereby discharging the secondary battery 100. The safety device 140 may include a piezoelectric element 141, a conductor 142, an insulator 143, an elastic member 144 and a wire 145.

The piezoelectric element 141 may be rectangular and have an opening or hole 141a formed at its center. According to an embodiment, the piezoelectric element 141 may have four sidewalls and the hole 141a may extend between the four sidewalls. The hole 141a of the piezoelectric element 141 may be sized to fit or receive at least an end portion of the first collector plate 121, such that the four sidewalls of the piezoelectric element 141 surround outer surfaces of the end portion. For example, the piezoelectric element 141 may be configured to permit insertion of the end portion of the collector plate 121 in the hole 141a. Here, the hole 141a may have the same size or about the same size as the first collector plate 121. For example, the four sidewalls of the piezoelectric element 141 may contact the outer surfaces of the end portion of the collector plate 121, once the end portion of the collector plate 121 is inserted in the hole 141a.

The conductor 142 may be rectangular and have a hole 142a formed at its center. According to an embodiment, the conductor 142 may have four sidewalls and the hole 142a may extend between the four sidewalls of the conductor 142. The hole 142a of the conductor 142 may be sized to fit or receive the piezoelectric element 141, such that the four sidewalls of the conductor 142 surround the four sidewalls of the piezoelectric element 141. Here, the hole 142a may have the same or about the same size as the piezoelectric element 141. For example, the four sidewalls of the conductor 142 may contact the four sidewalls of the piezoelectric element 141. Therefore, as the four sidewalls of the piezoelectric element 141 may contact the outer surfaces of the end portion of the collector plate 121, and as the four sidewalls of the conductor 142 may contact the four sidewalls of the piezoelectric element 141, the conductor 142 may be in contact with the collector plate 121 via the piezoelectric element 141. In addition, the wire 145 may be positioned under the conductor 142 and connected to the second collector plate 131. Therefore, the wire 145 may connect the conductor 142, which is connected to the collector plate 121 via the piezoelectric element 141, to the second collector plate 131.

The insulator 143 may be rectangular and have a hole 143a formed at its center. According to an embodiment, the insulator 143 may have four sidewalls and the hole 143a may extend between the four sidewalls. The hole 143a of the insulator 143 may be sized to fit or receive the conductor 142, such that the four sidewalls of the insulator 143 surround the four sidewalls of the conductor 142. Here, the hole 143a may have the same or about the same size as the conductor 142. For example, the four sidewalls of the insulator 143 may contact the four sidewalls of the conductor 142.

In order to electrically short the first collector plate 121 and the first terminal pillar 122 in an event of overcharge, the elastic member 144 may be substantially 'U' shaped to have one surface opened to expose, e.g., the conductor 142 (FIG. 4). For example, the elastic member 144, i.e., an elastic conductive member, may have two substantially parallel sides that are connected only at one end by a third side, as further illustrated in FIG. 4. The elastic member 144 may include a first connecting section 144a, a second connecting section 144b and a third connecting section 144c. The first connecting section 144a may be fixed to the first collector plate 121 and contact the first collector plate 121. The second connecting section 144b may extend from the first connecting section 144b and contact the insulator 143. Since the second connecting section 144b may thereby overlap the piezoelectric element 141, the conductor 142 and the insulator 143, the second connecting section 144b may be formed higher than or have a greater height than the first connecting section 144a. In other words, the piezoelectric element 141, the conductor 142 and the insulator 143 may be retained within the second connecting section. The third connecting section 144c may extend from the second connecting section 144b and contact the first electrode terminal 120. When the internal pressure of the secondary battery 100 exceeds a predetermined pressure due to overcharge, the safety device 140 may be shorted because the piezoelectric element 141 may be enlarged to more closely contact the conductor 142 and the collector plate 121 (as the piezoelectric element 141 with the collector plate 121 are inserted inside the hole 142a within the conductor 142), and to electrically connect therebetween. The third connecting section 144c may be formed to have a round shape or a rounded portion, so that the safety device 140 is easily shorted. The third connecting section 144c may include a plurality of units or fingers spaced apart from each other. Alternatively, the third connecting section 144c may be formed as a single unit.

The wire 145 may electrically connect a bottom portion of the conductor 142 to the second collector plate 131. When the internal pressure of the secondary battery 100 increases due to overcharge, the safety device 140 may be shorted through the wire 145 connecting the conductor 142 and the second collector plate 131 after the piezoelectric element 141 is enlarged, thereby discharging the secondary battery 100.

The case 150 may be made of a conductive metal such as aluminum, an aluminum alloy or nickel plated steel. The case 150 may be formed in a substantially hexahedral shape having an opening into which the electrode assembly 110, the first electrode terminal 120 and the second electrode terminal 130 may be inserted. The case may have an internal cavity in which the electrode assembly 110 may be retained or mounted. While no opening is illustrated in FIG. 2, as the case 150 and the cap assembly 160 are assembled, the opening substantially corresponds to an upper portion of the periphery of the cap assembly 160, or the upper edge of the cap assembly 160. The interior surface of the case 150 may be insulated, so that the case 150 may be insulated from the electrode assembly 110, the first electrode terminal 120, the second electrode terminal 130 and the cap assembly 160. The case 150 may have polarity, e.g., positive polarity, to serve as a positive electrode.

The cap assembly 160 may coupled to the case 150. In detail, the cap assembly 160 may includes a cap plate 161, a seal gasket 162, a plug 163, a safety vent 164, an upper insulation member 165, a first lower insulation member 166 and a fixing member 167. Here, the seal gasket 162, the upper insulation member 165 and the lower insulation member 166 may be interposed between the second electrode terminal 130 and the cap plate 161 to insulate the second electrode terminal 130 from the cap plate 161.

The cap plate 161 may seal the opening of the case 150 and may be made of the same material as the case 150. For example, the cap plate 161 may be coupled to the case 150 by laser welding. As described above, the cap plate 161 may have the same polarity as the first electrode terminal 120. Similarly, the cap plate 161 and the case 150 may have the same polarity.

The seal gasket 162 may be made of an insulating material and may be formed between the second terminal pillar 132 and the cap plate 161 to seal a portion or gap between the second terminal pillar 132 and the cap plate 161. The seal gasket 162 may prevent external moisture from permeating into the secondary battery 100 or prevent an electrolyte accommodated or retained in the secondary battery 100 from flowing out.

The plug 163 may seal an electrolyte injection hole 161a of the cap plate 161.

The safety vent 164 may be installed in a vent hole 161b of the cap plate 161 and may have a notch 164a configured to be opened at a predetermined pressure, for example, a predetermined internal pressure of the secondary battery 100.

The upper insulation member 165 may be formed between the second terminal pillar 132 and the cap plate 161. In addition, the upper insulation member 165 may closely contact the cap plate 161. Further, the upper insulation member 165 may also closely contact the seal gasket 162. The upper insulation member 165 may insulate the second terminal pillar 132 from the cap plate 161.

The lower insulation member 166 may be formed between the second collector plate 131 and the cap plate 161, and prevent unnecessary short-circuits. That is to say, the lower insulation member 166 may prevent a short-circuit between the second collector plate 131 and the cap plate 161. The first lower insulation member 166 may have a coupling groove 166a sized to fit the first terminal pillar 122. In other words, the coupling groove 166a may be configured to permit insertion of the first terminal pillar therethrough. The coupling groove 166a may be coupled to the first terminal pillar 122. The lower insulation member 166 may have side grooves 166b formed at opposite sides or opposing sidewalls of the first lower insulation member 166, so as to engage the fixing member 167.

Figure 6A:
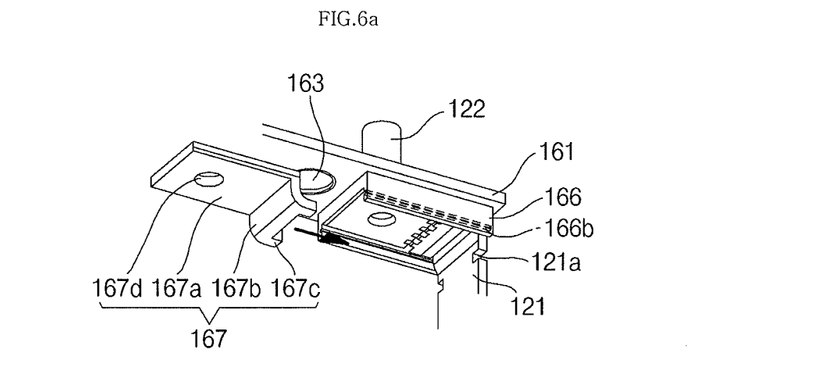
FIG. 6A illustrates a perspective view of a fixing member and a lower insulation member of the secondary battery shown in FIG. 1, in a disconnected state.
Figure 6B:
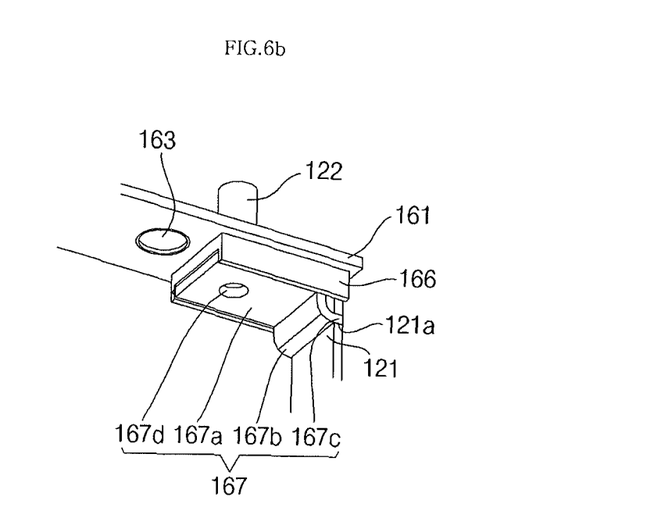
FIG. 6B is a perspective view illustrating a coupled state of the fixing member and the lower insulation member of the secondary battery shown in FIG. 1.
Figure 6C:
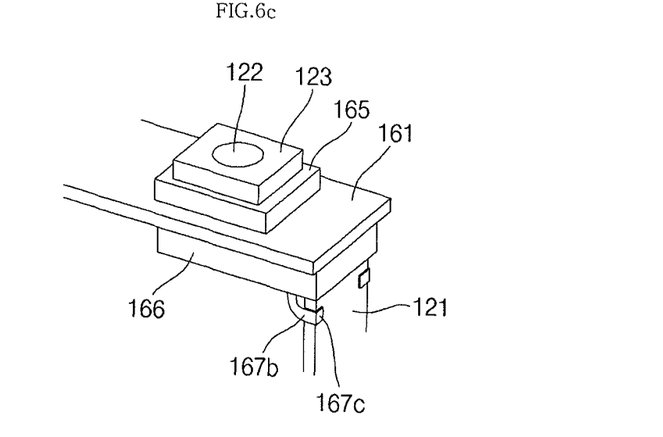
FIG. 6C is a perspective view illustrating a coupled state of the fixing member in the secondary battery shown in FIG. 1.

FIG. 6A is a perspective view illustrating the fixing member 167 and the first lower insulation member in the secondary battery shown in FIG. 1. FIGS. 6B and 6C are perspective views illustrating the fixing member 167 connected to the first lower insulation member 166, in the secondary battery shown in FIG. 1.

As shown in FIGS. 6A and 6B, the fixing member 167 may be formed or disposed beneath the lower insulation member 166. The fixing member 167 may be slidably coupled to the lower insulation member 166 to fix or secure connect the first collector plate 121 and the first terminal pillar 122. The fixing member 167 may include a planar portion 167a, a curved portion 167b, and a coupling portion 167c.

The planar portion 167a may be slidably coupled to a groove 166b of the lower insulation member 166 to contact the lower insulation member 166, thereby tightly fixing or securely connecting the first terminal pillar 122. The planar portion 167a may have a hole 167d defined therein, which corresponds to the first terminal pillar 122. The curved portion 167b extends from the planar portion 167a and contacts the first collector plate 121 once positioned under the lower insulation member 166. The curved portion 167b may be formed in a substantially inverted 'L' shape. The coupling portion 167c may protrude from the curved portion 167b in opposite sides to surround the first collector plate 121. For example, the coupling portion 167c may include projections extending from opposing sides of the curved portion 167b. In addition, the coupling portion 167c may be configured to fit into insertion grooves 121a at opposing side edges of the first collector plate 121, to tightly fix or securely connect the first terminal pillar 122 to the first collector plate 121.

According to some embodiments, the secondary battery may be capable of preventing overcharge. According to some embodiments, the secondary battery may include a safety device, which may prevent malfunction of the secondary battery due to excessive pressure.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery comprising:
    a case including an opening and an internal cavity;
    an electrode assembly disposed in the internal cavity;
    a first collector plate electrically connected to the electrode assembly and disposed in the internal cavity;
    an electrode terminal electrically connected to the electrode assembly;
    a cap plate sealing the opening of the case; and
    a safety device between the first collector plate and the electrode terminal, the safety device including at least one conducting portion between the first collector plate and the electrode terminal,
    wherein a portion of the electrode terminal extends beyond the cap plate such that the electrode terminal is exposed,
    wherein the at least one conducting portion of the safety device includes a conductor and a conductive elastic member, and
    wherein the safety device further comprises:
        a piezoelectric element coupled to the collector plate,
        the conductor on the piezoelectric element,
        an insulator on the conductor, and
        the conductive elastic member on the insulator and connecting the electrode terminal and the collector plate.

2. The secondary battery as claimed in claim 1, further comprising:
    a second collector plate connected to the electrode assembly, the second collector plate having a polarity that is different from a polarity of the first collector plate; and
    a wire connecting the second collector plate and the conductor.

3. The secondary battery as claimed in claim 1, wherein at least an end portion of the first collector plate is retained within the piezoelectric element.

4. The secondary battery as claimed in claim 3, wherein the piezoelectric element is retained within the conductor.

5. The secondary battery as claimed in claim 4, wherein the conductor is retained within the insulator.

6. The secondary battery as claimed in claim 1, wherein the conductive elastic member comprises:
    a first connecting section contacting the first collector plate;
    a second connecting section extending from the first connecting section and contacting the insulator; and
    a third connecting section extending from the second connecting section and contacting the electrode terminal.

7. The secondary battery as claimed in claim 6, wherein the third connecting section includes a plurality of projections.

8. The secondary battery as claimed in claim 6, wherein the conductive elastic member is substantially U-shaped and includes three sidewalls and a central opening extending therethrough.

9. The secondary battery as claimed in claim 8, wherein the conductive elastic member is configured to retain the piezoelectric element, the conductor, and the insulator therein.

10. The secondary battery as claimed in claim 1, wherein a lower insulation member is disposed between the collector plate and the cap plate, a fixing member is coupled to a bottom portion of the lower insulation member, and the fixing member includes a planar portion contacting the lower insulation member, a curved portion contacting the collector plate, and a coupling portion protruding from the curved portion and contacting opposing edges of the collector plate.

11. The secondary battery as claimed in claim 10, wherein the collector plate has an insertion groove formed therein, and the coupling portion is disposed in the insertion groove.

12. The secondary battery as claimed in claim 11, wherein the insertion groove includes two insertion grooves defined in opposing side edges of the collector plate.

13. The secondary battery as claimed in claim 10, wherein the fixing member is slidably coupled to the lower insulation member.

* * * * *